US008160986B2

(12) United States Patent
Lamprecht et al.

(10) Patent No.: US 8,160,986 B2
(45) Date of Patent: Apr. 17, 2012

(54) METHOD AND SYSTEM FOR IDENTIFYING INFORMATION RELATED TO A GOOD UTILIZING CONDITIONAL PROBABILITIES OF CORRECT RECOGNITION

(75) Inventors: Thorsten Lamprecht, Winterthur (CH); Harald Mebold, Constance (DE); Walter Rosenbaum, Paris (FR)

(73) Assignee: Siemens Aktiengesellschaft, Munich (DE)

( * ) Notice: Subject to any disclaimer, the term of this patent is extended or adjusted under 35 U.S.C. 154(b) by 820 days.

(21) Appl. No.: 12/240,172

(22) Filed: Sep. 29, 2008

(65) Prior Publication Data

US 2009/0089236 A1    Apr. 2, 2009

(30) Foreign Application Priority Data

Sep. 27, 2007    (EP) .................................... 07019016

(51) Int. Cl.
*G06F 17/00* (2006.01)
*G06N 5/02* (2006.01)
(52) U.S. Cl. ............................... 706/46; 706/45; 706/20
(58) Field of Classification Search .................. None
See application file for complete search history.

(56) References Cited

U.S. PATENT DOCUMENTS

| 6,539,098 B1 | 3/2003 | Baker et al. |
| 6,557,749 B1 | 5/2003 | Gill |
| 6,996,525 B2 | 2/2006 | Bennett et al. |
| 7,228,275 B1 | 6/2007 | Endo et al. |
| 2002/0152069 A1* | 10/2002 | Gao et al. ...................... 704/240 |
| 2003/0098265 A1* | 5/2003 | Steinmetz et al. ............ 209/584 |
| 2003/0099401 A1 | 5/2003 | Driggs et al. |
| 2003/0179906 A1* | 9/2003 | Baker et al. .................... 382/101 |
| 2004/0138885 A1 | 7/2004 | Lin |
| 2006/0229871 A1* | 10/2006 | Yamamoto et al. ........ 704/256.6 |
| 2006/0248026 A1* | 11/2006 | Aoyama et al. ................. 706/12 |
| 2007/0055662 A1* | 3/2007 | Edelman et al. .................. 707/6 |

FOREIGN PATENT DOCUMENTS

WO    0122354 A1    3/2001

OTHER PUBLICATIONS

International Search Report and Written Opinion dated Dec. 18, 2008.

* cited by examiner

*Primary Examiner* — Jeffrey A Gaffin
*Assistant Examiner* — Adrian Kennedy
(74) *Attorney, Agent, or Firm* — Laurence A. Greenberg; Werner H. Stemer; Ralph E. Locher (57) ABSTRACT

A method and a system identify information placed on a good to be processed, and the way of processing the good depends on this information. With regard to the method, the following steps are performed reading the information by an identifier and speaking the information as a voice message into an information retrieval system; delivering the voice message to a plurality of voice recognition systems; analyzing the voice message in each of the plurality of voice recognition systems and identifying a preliminary result; evaluating the preliminary results utilizing conditional probabilities of correct recognition in order to identify the most probable result among the preliminary results best matching the initial information; and assigning the most probable result to the respective good. The system provides a reliable, high-speed multi speech recognition even in high ambient noise environments without the cost and complexity of introducing an OCR.

11 Claims, 7 Drawing Sheets

METHOD AND SYSTEM FOR IDENTIFYING INFORMATION RELATED TO A GOOD UTILIZING CONDITIONAL PROBABILITIES OF CORRECT RECOGNITION

CROSS-REFERENCE TO RELATED APPLICATION

This application claims the priority, under 35 U.S.C. §119, of European application EP 07019016, filed Sep. 27, 2007; the prior application is herewith incorporated by reference in its entirety.

BACKGROUND OF THE INVENTION

Field of the Invention

The invention relates to a method and a system for identifying information placed on an item to be processed, wherein the way of processing depends on the information.

Systems for the automatic reading of distributing information, particularly addresses, are well known in the field of mail processing. Modern OCR (optical character recognition) letter sorting equipments make it possible to achieve processing rates of 10 letters per second or more. The automatic processing of parcels is more complicated due to the multitude of forms and sizes for parcels and many possible locations of addresses on even or round surfaces.

To register address information on parcels it is well known to have the information spoken by an operator and analyze the spoken words by a speech recognition system. The identified address is sent to the sorting system processing the parcels. Unfortunately, short utterances like a country name, city or a part of a postal code, in particular accompanied by a noisy ambient working environment, cause speech recognition processing to have diminished reliability.

In some circumstances audio feedback has been proposed whereby every final speech recognition result is "spoken" back to the operator using synthetic voice for them to accept before the recognition result is released for sorting. Alternatively the feedback to the operator can be via visual display. In either mode of speech recognition with feedback to the operator where a confirmation step is required throughput is diminished to less than half the operator voicing speed and hence the productivity is not adequate for most operations.

To solve this reliability problem a technology called Hybrid Voice introduces an OCR integral to the final speech recognition step. In a first step speech recognition generates a list of possible results from the utterance, and in a second step OCR searches for a result consistent with any result from the list to identify the intended utterance with high reliability. Although Hybrid Voice works well, it adds the cost, physical installation and complexity of an OCR unit to the speech recognition process.

From U.S. Pat. No. 6,996,525 it is known to use a recognizer's properties and performance measured in statistical terms to select a candidate from among several alternatives presented by independent speech recognizers.

SUMMARY OF THE INVENTION

It is accordingly an object of the invention to provide a method and a system for identifying information related to a good that overcome the above-mentioned disadvantages of the prior art methods and devices of this general type, which is reliable and cost effective.

With respect to the method the object is solved by a method for identifying information placed on a good to be processed, wherein the way of processing depends on this information. The method includes the steps of: determining the information by an information determining device, for instance a camera, converting it into processed information, a signal for instance, and passing the processed information to an information retrieval system; delivering the processed information to a plurality of artificial intelligence packages, such as optical character recognition device for example; analyzing the processed information in each of the plurality of artificial intelligence packages and identifying preliminary results; evaluating the preliminary results in order to identify the most probable result among the preliminary results best matching the initial information; and assigning the most probable result to the respective good.

The artificial intelligence systems may be optical character recognition systems, RFID-reader systems (radio frequency identification) or the like. A multitude of artificial intelligence systems may be used, giving several alternative interpretations with various confidence levels.

The disclosed invention provides very reliable, high-speed information recognition even with occurring interfering influences, without the cost and complexity of introducing two different information recognition systems.

In a preferred embodiment of the invention the method uses voice recognition systems as artificial intelligence packages. In this embodiment the method includes the steps of: reading the information by an identifier and speaking the information as a voice message into an information retrieval system; delivering the voice message to a plurality of voice recognition systems; analyzing the voice message in each of the plurality of voice recognition systems and identifying preliminary results; evaluating the preliminary results in order to identify the most probable result among the preliminary results best matching the initial information; and assigning the most probable result to the respective good.

The disclosed invention provides very reliable, high-speed speech recognition even in high ambient noise environments without the cost and complexity of introducing an OCR. Throughput may be over twice that of state-of-the-art speech recognition with consistent, candidate-by-candidate audio or display feedback. This multi voice recognition system has the potential to achieve similar very high recognition accept rates and reliability as Hybrid Voice but it does not require the integration of OCR processing.

Further description of the invention is focused on a voice message as processed information and voice recognition systems as artificial intelligence packages. However, the invention is not limited to that, but to be understood more broad, so that all described details in this specification may be combined with the above stated general view of the invention.

The invention uses multiple voice recognizers working in parallel. The overall efficacy of the disclosed system and process is based on the plurality of respective speech recognition units that may advantageously be independent in the manner in which they analyze the energy pulses of an operator's utterances and derive a match to items in the directory. Advantageously the different voice recognition systems apply different voice recognition strategies. Namely by working with different recognizing algorithms or recognition techniques that may have been independently developed. So each voice recognizer or speech-recognition unit may apply its own recognition strategy or strategies based on different phonetic speech models, matching algorithms, etc. As a consequence they may deliver different recognition results upon processing the same utterance, especially in a noisy environment.

In a preferred embodiment of the invention the different strategies are based on different voice activity detection algorithms and/or on different matching algorithms.

The disclosed multi-speech recognizer coding is built upon the principle of combining the output of multiple, different speech recognizers to derive a final identification of an utterance, especially from the set of alternatives offered by the disparate independent recognizers. Advantageously intra and preferably inter recognizer conditioned probabilities are used to derive the final identification of an utterance.

The recognition results of the plurality of recognizers may be used as preliminary results. The preliminary results may contain a list of candidates derived from the utterance that has been turned into the voice message. Each candidate may be combined with a goodness score being a relative goodness of match or confidence value. The goodness score may be a numerical or alphanumerical value within a numerical area freely chosen by the manufacturer of the voice or speech recognition systems. Every speech recognition system should—under most circumstances—identify at least one preliminary result or candidate. This group of preliminary results of the plurality of different recognition systems as a whole may be evaluated in order to identify the most probable result among the preliminary results best matching the initial information.

The good to be processed may be any kind of mail pieces, especially parcels; the information could be sorting information like an address or a part of an address. The information may be read by an operator speaking the information as a voice message into an information retrieval system.

In a preferred embodiment of the invention the multi speech recognizer process may be supported by audio/display feedback to the operator, particularly where the inference of the most probable result is indeterminate in a first attempt.

If for example all the recognizers give the same first choice—there is very high confidence and the candidate can be accepted for sorting right away. Other such empirical relationships that empirically infer a high recognition probability are, for example, where only a single candidate interpretation is common to all respective recognizer lists.

If there is no clear empirical best choice, conditional probabilistic methods may be used as described below. Additionally an audio or display feedback may be used for operator confirmation before sorting where additional assurance is required beyond that provided by the disclosed method of conditional probability. In most instances, this confirmation step entails either using synthetic speech to pronounce the top but still ambiguous candidate(s) into the operator's earphones—for the operator to then state: <yes> or <no>. The displaying to the operator can also be performed via a display screen mounted convenient to the induction area or even a body mounted display such as on the wrist or back of hand mounted.

When speech recognition requires audio/display feedback the operator states <yes> or <no>. If rejected, the operator can re-voice. This additional voice message originating from the same information, e.g. the word or postcode on a parcel, is again delivered to the same voice recognition systems generating new preliminary results. These may be added to the preliminary results obtained in the first voicing, now delivering preliminary results of "additional recognizers", so that the combination of results may be treated as results of 2n voice recognition systems, where n is the number of voice recognition systems of the system for identifying information on a good. Conditional probability methods may be applied to the 2n-recognizer system. In case of further re-voicing the system may be a Nn-system, where N is the number of voicing procedures of the same information.

The re-voicing may be repeated until a candidate is accepted or finally rejected after a given number of re-tries. Where a display is used for operator feedback the top candidates can be displayed and the operator making a selection by spoken number.

Due to the filtering of being able to threshold reliable acceptance via the use of multiple-speech recognizers, only a relatively small corpus of results require audio or display operator feedback. Additionally, the utilization of additional speech recognizers or their tuning to for example to have especially fine numeric recognition, or operator training can be used further to reduce the number of occurrences of operator feedback and correspondingly increase throughput.

In another embodiment of the invention the preliminary results contain a list of candidates of most probable results from each voice recognition system. The number of candidates in the list may vary from list to list as well as the ranking of identical candidates in the lists. Even the candidates as such may differ from list to list, even so far that there is not one of the candidates of one list existent in another list. The candidates could be a word, a character, a numeral, a string of characters or numerals, a phrase or a part of a phrase.

In a further embodiment of the invention the preliminary results contain a group of identification parameters from each voice recognition system. A plurality of identification parameters offers a plurality of analyzing methods, leading to a high reliability of identifying the right candidate. In particular the preliminary results contain a group of identification parameters for each of the candidates. So each candidate of every recognition system is related to an individual group of identification parameters.

An identification parameter may be a value of a recognition goodness score (e.g. a number or range in a span of 2000-6000 for one recognizer and of 100-200 for another recognizer), a list position number in a candidate list ($1^{st}$, $2^{nd}$, $3^{rd}$, . . . ), a number of recognizer lists containing the same candidate in their candidate list, a distance between recognition goodness values from the next highest candidate's recognition goodness value, a discrete parameter representing a reliability of a voice recognition system, or the like.

The principle of combining the output of multiple, different speech recognizers may lead to the problem of deriving a single selection from the candidates for sorting or other purposes. Essentially, each of the multiple speech recognition systems assigns a relative goodness of match to the recognition candidates it derives from an utterance. The relative goodness—a numerical value—may be taken as guidance for choosing the best matching candidate. However, there is no a priori common denominator for comparison between candidates generated by different, independently developed speech recognizers and their respective goodness of match scores, even when all recognizers are responding to the same utterance as is the circumstance in this disclosure.

This disadvantage may be overcome if the preliminary results of each speech recognition system—or a parameter of the preliminary results—are processed as a conditional probability statement given the likelihood that the candidate is "the correct recognition". The conditional probability statement—also named as conditional probability in the following—may be based on inter or intra recognizer measures of recognition goodness coincident with the voicing, or on both, inter and intra recognizer measures. By conditioning calculated recognition identification parameters of the recognition systems are made comparable to one another.

In this embodiment of the invention the evaluation of the preliminary results may be carried out by conditional probabilities of correct recognition, whereas the conditional probabilities may be previously derived from parallel assessment of all systems of read information. So the conditioning can be done by an assessment of all speech recognition systems in parallel sessions by one or multiple users and thereby compiling over a broad set of vocabulary and users—if done so. As a result of the above statistically significant number of cases are thereby developed and the probability for a given recognizer yielding a correct recognition conditioned (e.g. in a Bayesian probability sense) is computed upon, for example for each possible or assessed condition or pattern of values of identification parameters. In other words, a conditional or Bayesian probability is quantified for covering the domain of respective recognizer goodness and other identification parameters that a given recognizer candidate is "the correct recognition" for a given utterance.

The conditional probability statement of correct recognition may be derived for each candidate in the respective recognizer output lists related to the same utterance, and is then stored as factor in a table. For ease of computation the above conditional probabilistic statements can be computed using only predefined ranges of recognition goodness values for each respective recognizer.

Advantageously the conditional probabilities or conditional probability statements are processed for a plurality of conditions described by preliminary results of all of the plurality of voice recognition systems. By this an inter recognizer evaluation of the preliminary results is conducted, or in other words a conditional probabilistic inference is created from an inter-recognizer perspective. The preliminary results may be values of at least one identification parameter, for example a goodness score of the voice recognition systems.

In a further embodiment of the invention the preliminary results may be values of a plurality of identification parameters, for example a goodness score and the position of a candidate in the candidate lists, spanning a multidimensional parameter space where each condition may be seen as a multidimensional pattern. As in the one-dimensional example every condition or pattern a probability is assigned which may have been derived from the assessment of the plurality of recognition systems. If in practical operation of the identification system—in a parcel sorting process, for example—a condition or pattern occurs with respect to a preliminary result or candidate, the probability of this pattern is either known or may be derived from known probabilities of other patterns by known statistics, as Bayesian probability or the like. By this a conditional probability statement is found giving the probability that this candidate is the correct recognition for the given utterance.

If more than one candidate has a conditional probability exceeding a predefined threshold this union of candidates or union of conditional probabilities may be taken all together for further investigation, for example by performing a pattern match procedure, as Hidden Markov Recognizer (HRM) correlation or Hidden Markov Process.

With respect to the system and to voice recognition the above mentioned object is solved by a system for identifying information placed on a good to be processed, wherein the way of processing depends on this information. The system includes a device for reading the information by an identifier and speaking the information as a voice message into an information retrieval system; a device for delivering the voice message to a plurality of voice recognition systems; a device for analyzing the voice message in each of the plurality of voice recognition systems and for each voice recognition system identifying a preliminary result; a device for evaluating the plurality of the preliminary results in order to identify the most probable result among the preliminary results best matching the initial information; and a device for assigning the most probable result to the respective good.

Very reliable, high-speed speech recognition may be achieved even in high ambient noise environments without the cost and complexity of introducing an additional OCR.

The device for evaluating the plurality of the preliminary results is preferably prepared to perform the evaluation from an inter-recognizer perspective to create conditional probabilistic inference in order to identify the most probable result among the preliminary results best matching the initial information.

Other features which are considered as characteristic for the invention are set forth in the appended claims.

Although the invention is illustrated and described herein as embodied in a method and a system for identifying information related to a good, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
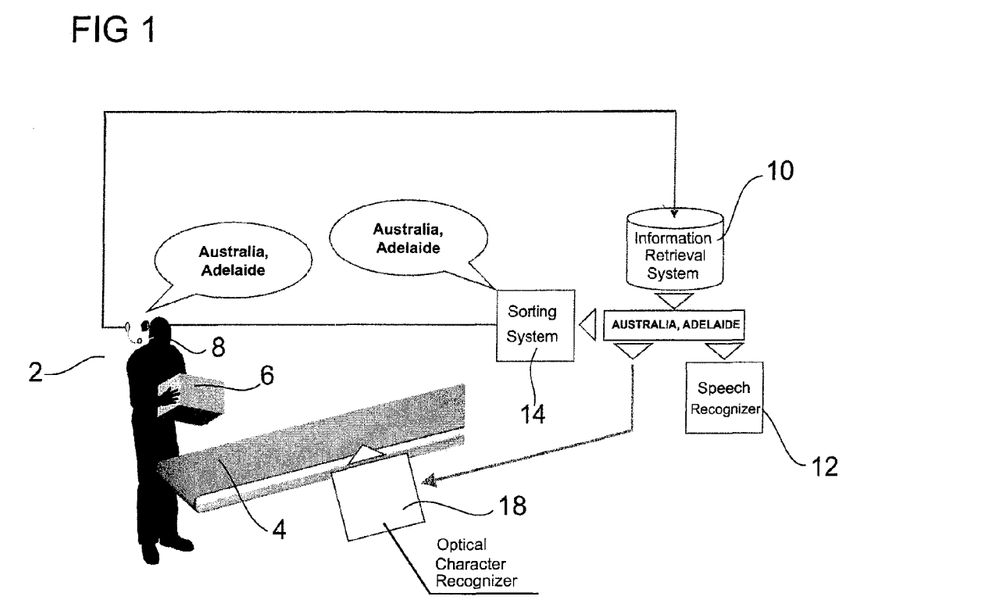
FIG. 1 is a diagrammatic, illustration of an operator on a parcel transport belt dictating a part of an address written on a parcel into a voice recognition installation.

Referring now to the figures of the drawing in detail and first, particularly, to FIG. 1 thereof, there is shown a schematic view of an operator 2 on a parcel transport belt 4 carrying a parcel 6 on which information in a form of an address is written. The operator 2 reads the address and dictates it into a microphone 8 on a head set. The microphone is connected wirelessly to a plurality of speech recognitions systems and a database with an information retrieval system 10 containing address expressions.

The utterance of the operator 2—for example "Australia, Adelaide"—is analyzed by the speech recognition installation 12 (FIG. 2) of the information retrieval system 10 outputting the result "Australia, Adelaide" in digital form to a sorting system 14 for routing and sorting the parcel 6. In the case that the best conditional probability of correctly recognizing the utterance determined by the speech recognition installation 12 from all candidates falls below a predetermined limit the digital result is fed to a voice processor 16 which generates an audio feedback, so that the words "Australia, Adelaide" are spoken back into the operators ear phones using synthetic voice. The operator 2 states <yes> or <no> causing either the result to be passed to the sorting system 14 or causing a synthetic reading of the next good result into the ear phones.

Additionally or alternatively the outputted result from the speech recognition installation 12 may be fed to an optical character recognizer 18 using the results as pre-selection in hybrid voice recognition.

Figure 2:
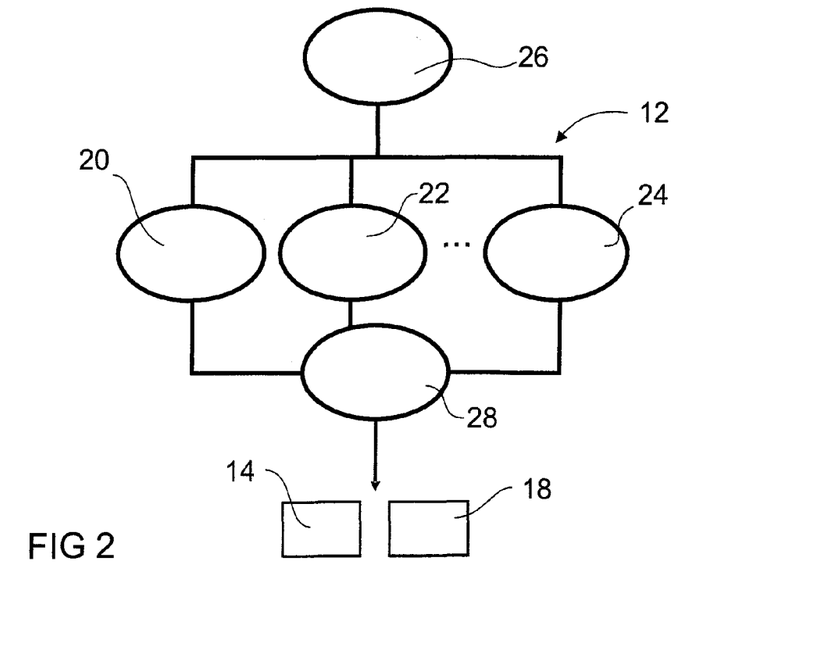
FIG. 2 is a schematic diagram of a voice recognition installation using parallel independent speech recognition systems.

The process of voice recognition by the speech recognition installation 12 is described in more detail by the following figures. FIG. 2 shows the speech recognition installation 12 containing a plurality of parallel voice or speech recognition systems 20, 22, 24. Any number of systems 20, 22, 24 may be used, while only three systems 20, 22, 24 are shown for reasons of simplicity.

An utterance 26 of the operator 2 is delivered to the speech recognition systems 20, 22, 24 in form of acoustic waves or electronic signals derived there from. Each of the speech recognition systems 20, 22, 24 independently analyzes the utterance or signal and delivers its result to an evaluation system 28 of the speech recognition installation 12. The evaluation system 28 determines the best result that is delivered to the voice processor 16 or the optical character recognizer 18.

The overall efficacy of the disclosed system and process is based on each of the respective speech recognition system 20, 22, 24 being largely independent in the manner in which they analyze the energy pulses of an operator's 2 utterances and derive a match to items in the directory. Independence in the sense used above means that each speech recognition system 20, 22, 24 applies its own recognition strategies based on different phonetic speech models, matching algorithms etc.

Figure 3:
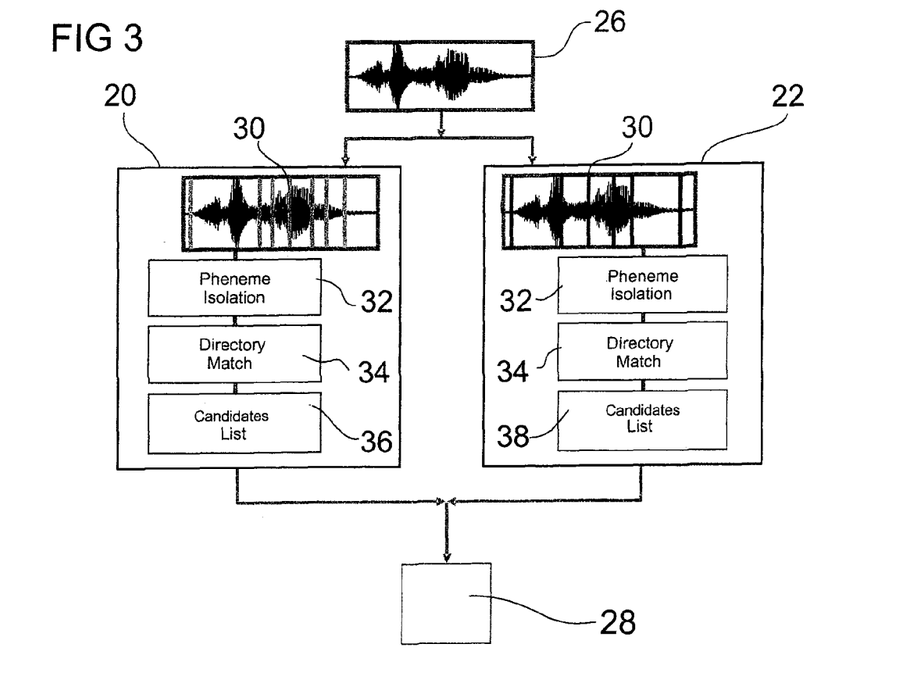
FIG. 3 is an illustration of speech recognition systems using different ways to segment the same utterance.

The speech recognition systems 20, 22, 24 may be regular products developed by different companies with different methods. They may work independently from one another with different software using different algorithms as indicated in FIG. 3. In each speech recognition system 20, 22, 24 the utterance 26 is treated differently as indicated by different phonetic fragmentations or segmentation 30 that are attempted to devolve the utterance's energy pulse into possible phonetic strings that can be matched against the directory of valid utterances—only two of which are shown—of the wave form in the system 20, 22, 24. As a result different phoneme isolations 32 are conducted by the systems 20, 22, 24 leading to different results. In a dynamic directory match 34 the results are compared with data in the data base and candidate lists 36, 38 are generated which are forwarded to the evaluation system 28.

Figure 4:
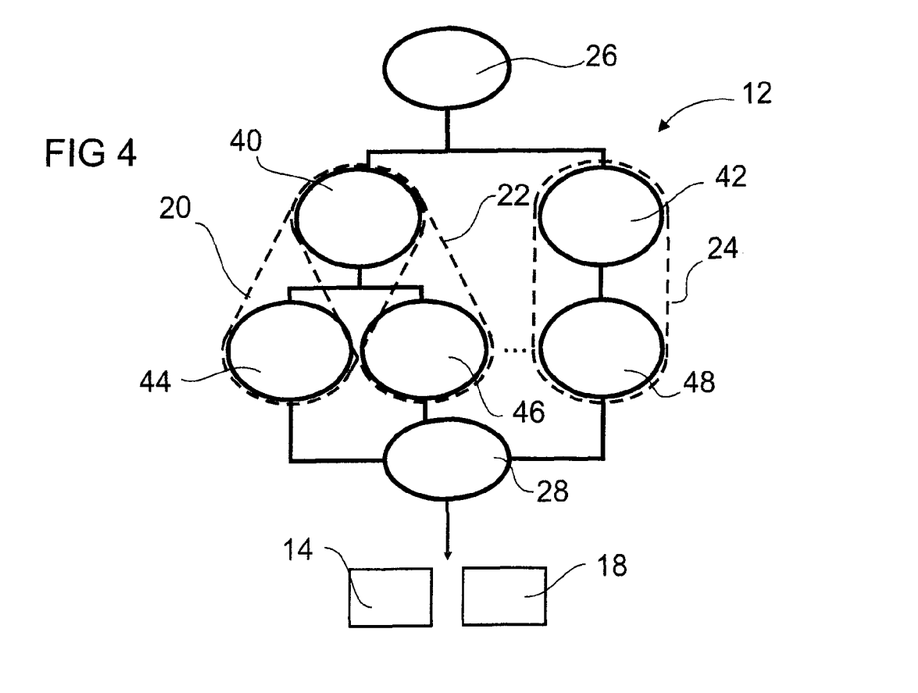
FIG. 4 is an illustration of the speech recognition systems using different voice activity detection devices.

In a preferred embodiment of the invention the parallel speech recognition processes start from independently developed voice activity detection 40, 42 as indicated in FIG. 4. In the embodiment shown in FIG. 4 speech recognition systems 20 and 22 use the same voice activity detection 40 to cooperate with speech recognition modules 44, 46 and speech recognition system 24 uses a different voice activity detection 42 to cooperate with speech recognition module 48. Ideally all speech recognition systems 20, 22, 24 use different voice activity detections 40, 42. Each speech recognition system 20, 22, 24 makes its first tentative assessment that it is acquiring a human utterance 26 which then initializes the actual speech recognition process where identification against a directory of application related words or phrases is performed. Within the scope of this invention is also the implementation where multiple recognizers 20, 22, 24 share a common voice activity detection 40, 42 or where more than one voice activity detection 40, 42 drives speech recognition.

The same directory entries are shared by all speech recognition modules 44, 46, 48 although respective modules 44, 46, 48 can have different lexical file extensions to allow for the idiosyncrasies of respective speech models 44, 46, 48 and other facets of the respective voice activity detection and recognition processes.

Figure 5:
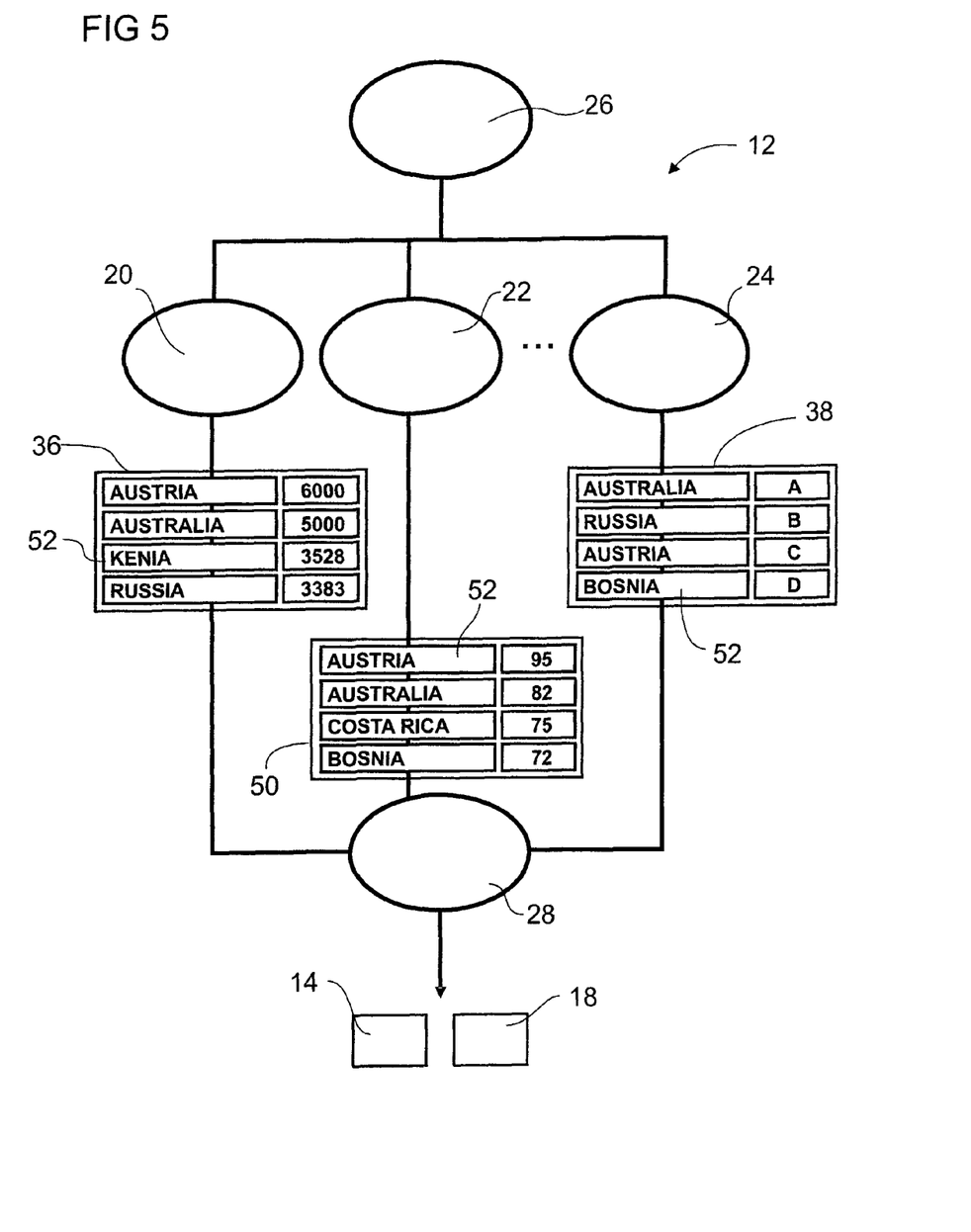
FIG. 5 is an illustration of an example of varying confidence values modes and result lists of speech recognition systems.

The respective speech recognition systems 20, 22, 24 individually output preliminary results in form of a number of candidates. They may be outputted in form of a candidate list 36, 38, 50 with a number of candidates 52, as shown in FIG. 5. The candidates 52 each have a quality of match (normally a numeric value relative to a range of values) goodness score or confidence value associated with them indicating by quantum (i.e., some analytical methodology defined by its designers) the degree/quality of match between the utterance and the directory entry. It is quite normal in such a setting that the respective speech recognition systems 20, 22, 24 will each output very different candidate selections as their resolution of a specific utterance and each speech recognition system 20, 22, 24 will associate with its candidates confidence values that reflect unique formulations that are relevant to the ranking of items in a respective candidate list 36, 38, 50 (intra-list) but in no way are comparable between candidate lists 36, 38, 50 (inter-list). Normally such confidence values are spanning a numeric range set by their designer however the above invention is also applicable if a recognizer assigns gradations like A, B, C . . . to signify goodness of match.

The confidence values may be taken as guidance for choosing the best matching candidate 52. However, there is no a priori common denominator for comparison between candidates 52 generated by different, independently developed speech recognition systems 20, 22, 24 and their respective quality of match scores, even when all speech recognition systems 20, 22, 24 are responding to the same utterance as is the circumstance in this disclosure. Also, although the initial voice input (spoken word) is identical for all recognizers, it has to be taken into account that voice detection and segmentation strategies might differ between speech recognition systems 20, 22, 24. Therefore candidates 52 might not be interpretations of the utterance as a whole but rather of differently segmented parts of it. Such artifacts may not only occur between recognizers (inter-list) but also within a list from one candidate 52 to the next (intra-list).

The invention being disclosed herein provides a general process and system to achieve ranking for a reliable final selection of the candidate 52 from the plurality of separate candidate lists 36, 38, 50 output from speech recognition systems 20, 22, 24 with no prior similar basis for inter-list goodness of recognition prioritization.

The method for inter-speech recognizer candidate ranking for final selection of a single identification to be associated with an utterance has two separate spheres of inference: logical and analytical—both are however statistical in their underpinnings.

Logical Inter-Recognizer Candidate Inference

Although it is normally expected that the respective recognizer's candidate lists 36, 38, 50 to be quite heterogeneous due to their independently developed voice activity detection and speech recognition algorithms, the occurrence of certain patterns of candidate occurrences between recognizers warrants giving special significance to such candidates 52.

For example—if all the recognizers give the same first choice—"logically" there is very high confidence that the candidate 52 is the correct speech recognition of the subject utterance and the candidate 52 can be accepted for sorting with very low probability of error.

Figure 6:
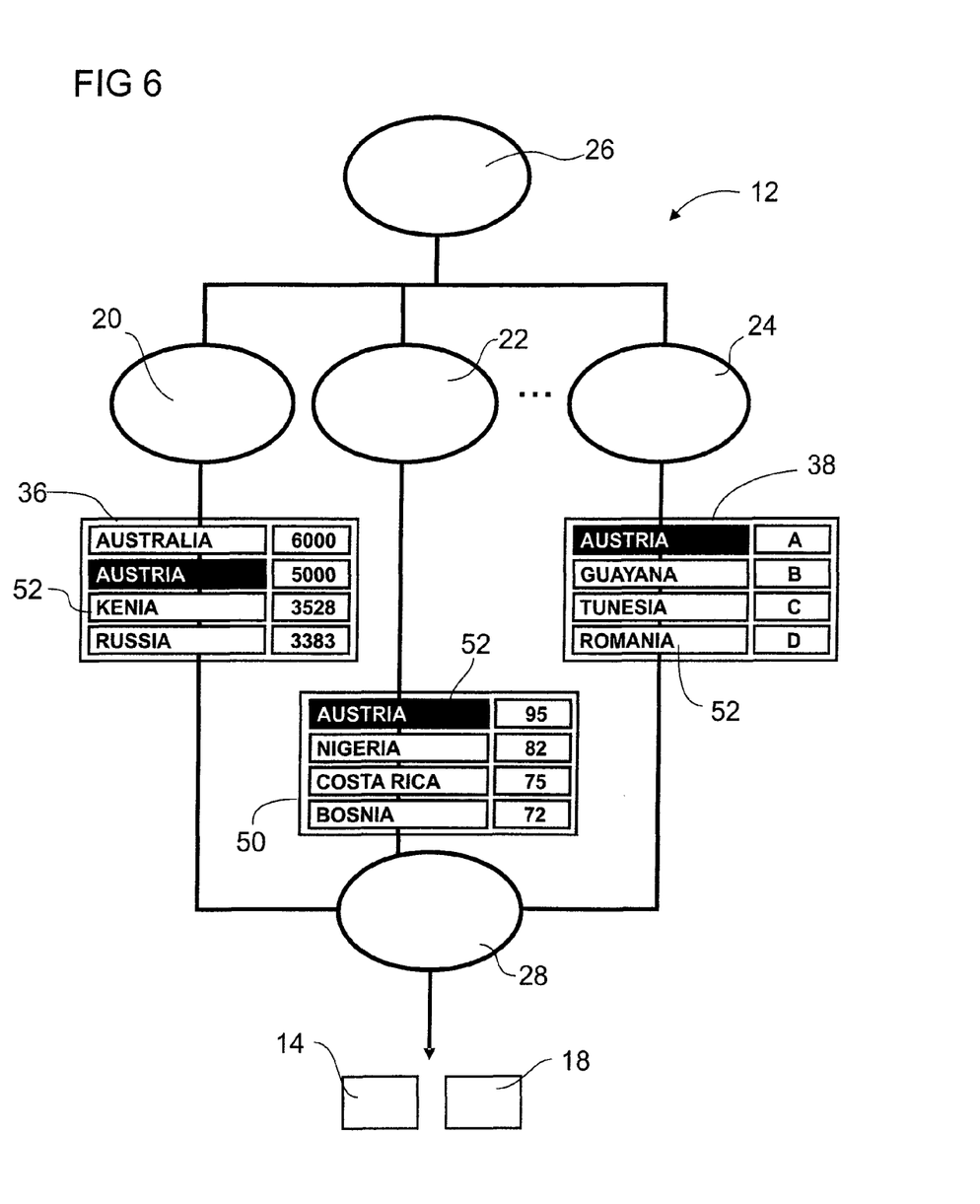
FIG. 6 is an illustration of a logical inter-recognizer candidate interference in the case of only one candidate common for all recognizers.

Additional logical criteria that allow for reliable inference that a given candidate 52 occurring in one or more candidate lists 36, 38, 50 warrants reliable acceptance for sorting are for example where only a single directory entry is common across all the recognizer candidate lists 36, 38, 50 or a segment of the lists 36, 38, 50 and all other candidates 52 are different as shown in FIG. 6.

However such clear logical criteria become more difficult to consistently realize operationally as more speech recognition systems 20, 22, 24 are added in parallel and exposed to high ambient/background noise and varied speakers. Hence quickly cases of multiple recognizer candidate returns are encountered that do not fit the logical cases as described above.

Analytical Inference

Figure 7:
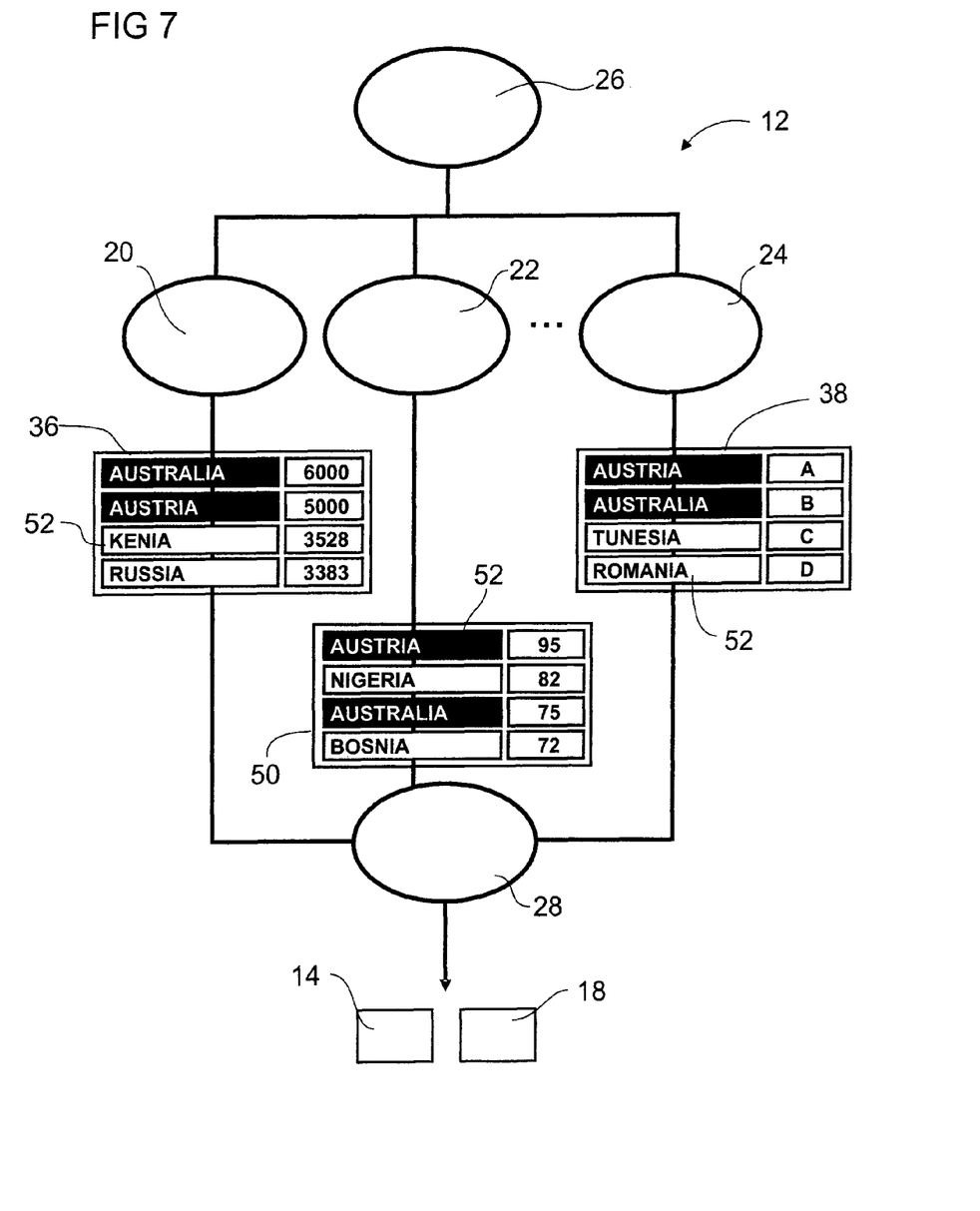
FIG. 7 is an illustration of an analytical inference in the case where not all lists share the same top candidate and they have more than one candidate in common.

It is reverted to analytical inference to make a candidate selection where for example not all the recognizers share the same top candidate 52 or there is no single candidate 52 that all the lists 36, 38, 50 share. An example of such a case is depicted in FIG. 7. Not all the lists 36, 38, 50 share the same top candidate 52 and they have more than one candidate 52 in common To resolve this problem, prior to operation, an assessment for a plurality of vocabularies is performed, where all speech recognition systems 20, 22, 24 are repetitively subjected in parallel sessions to multiple users and vocabularies. For example, a list of vocabulary is spoken into the speech recognition installation 12. The list itself is fed to the speech recognition installation 12 as well, but by way of authentic data transfer, so each word of the vocabulary list is known by the speech recognition installation 12.

Each time after a word is spoken the speech recognition installation 12 generates a table of candidate lists 36, 38, 50 as depicted below.

| Recognizer 1 | | Recognizer 2 | | Recognizer n | |
|---|---|---|---|---|---|
| Candidate 1a | Confidence Value 1a | Candidate 2a | Confidence Value 2a | Candidate na | Confidence Value na |
| Candidate 1b | Confidence Value 1b | Candidate 2b | Confidence Value 2b | Candidate nb | Confidence Value nb |
| ... | ... | ... | ... | ... | ... |
| Candidate 1n | Confidence Value 1n | Candidate 2n | Confidence Value 2n | Candidate nn | Confidence Value nn |

By this method a broad set vocabulary is compiled for the recognizers parallel output candidate lists 36, 38, 50 and a large number of tables are gained. Each recognizer's output candidate list results from a parallel session related to the same utterance. This can be repeated by a plurality of users.

In each table a plurality of candidates are listed in the lists of the table. Each candidate is ranked in each list where it is found and scored with a goodness score. The ranking and scoring of a candidate in one table represents a certain condition with respect to the candidate. Furthermore it is known whether the respective candidate is the correct candidate. So for each condition which appeared during the assessment it is known whether the candidate related to this condition is the correct candidate. When compiling over a broad number of conditions a probability can be calculated for each condition that the respective candidate is the correct candidate. By this the conditional probabilities are generated for a large set of conditions.

With this a statistically significant number of cases are developed where the inter-list calculated conditional probability for a given recognizer 20, 22, 24 with respect to identification parameters, e.g. the confidence value, can be computed yielding a correct recognition (in a Bayesian probability sense) based on identification parameters.

Each condition may be defined by way of values of one or more identification parameters. Each identification parameter may represent a dimension so that each condition is a position or a pattern in a one-dimensional or multidimensional parameter space. The dimensions may be but do not need to be a continuum. A parameter may take a plurality of values, like all numbers between 1000 and 6000, or take only a few values, at least two, like yes or no, or late or early.

Figure 8:
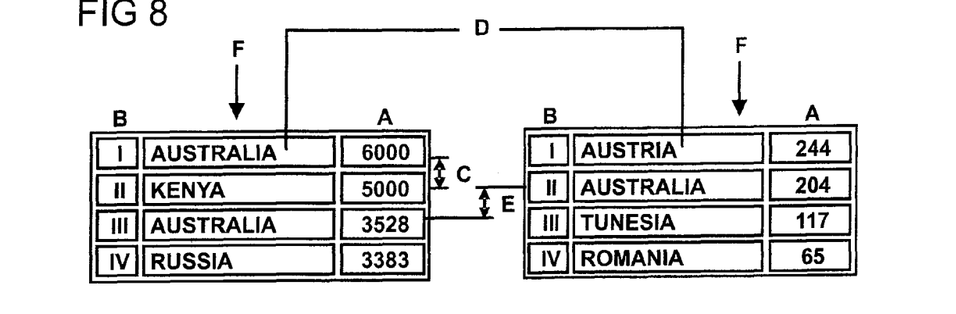
FIG. 8 is an illustration depicting confidence values as used in conditional probabilities.

A set of possible identification parameters A-F for calculating a conditional probability are indicated in FIG. 8. The set contains intra-system identification parameters A-C and inter-system identification parameters D-F using the candidates 52, candidate lists 36, 38, 50 or other parameter of all systems 20, 22, 24.

FIG. 8 shows a confidence value A or recognition goodness score (e.g. a number or range in a span of 2000-6000 for one recognizer and 100-200 for another recognizer). A position B in the candidate list 36, 38, 50 (1st, 2nd, 3rd, ... ) indicated by Latin numerals. A delta distance C of the candidate's confidence value A from the next highest candidate's confidence value A. A number D of recognizers 20, 22, 24 yielding the same candidate 52 somewhere in the output list 36, 38, 50. In the example given in FIG. 7 in all candidate's lists 36, 38, 50 the candidate 52 "Austria" is present. For this candidate 52 the parameter D is three. For the candidate 52 "Bosnia" the parameter D is one. If more than three voice recognition systems 20, 22, 24 are in use the parameter D may go up to the number of systems 20, 22, 24 used. FIG. 8 further shows an average distance E of the candidate's confidence value of another occurrence of the candidate.

To quantify a factor in a manner suitable to condition a probabilistic statement, we must normalize such relational information. For example in the current case the confidence values of a list of candidates 52 are normalized, by taking for each candidate 52 in a recognizer's list 36, 38, 50 the delta between a given candidate 52 and the next one in the list and divide it by the confidence value range of that list 36, 38, 50 or alternatively the confidence value range of the recognizer 20, 22, 24. In order to perform this calculation in case the candidate 52 is the last candidate 52 in the list 36, 38, 50, each recognition system 20, 22, 24 is configured to produce one additional candidate 52 for each list 36, 38, 50 that is stored for calculation purposes but does not appear in the list itself.

A sixth parameter F is the liability of the respective voice recognition system 20, 22, 24 in relation to the liability of the other voice recognition systems 20, 22, 24. This liability is determined experimentally, e.g. during an assessment of the speech recognition systems 20, 22, 24 and is different from the confidence value A in so far as it may include differences in recognition reliability from person to person, with respect to surrounding noise or with respect to other factors.

These six parameters are only examples. More or other parameters may be used. The conditional probabilities may depend considerably on the physical condition of the speaking operator, its stress, or mood. Therefore human factor related parameters may be used as, for instance, the time of day, the phase of a shift (early in the shift, in the middle of the shift, at the end of the shift), the shift as such (early shift, late shift, night shift), the sex of the speaking operator, the number of words spoken by the operator per amount of time, and the like.

For each candidate from the respective recognizer list a conditional probability or conditional probability statement $P_i$ is set up, conditioned on the parameters such as the above or other such reflective measures of recognition quality. The probability statements $P_i$ indicate the conditional probability that the respective candidate is correct, and may be listed:

$P_1$ (recognition goodness score; list position; number of recognizer list, . . . );

$P_2$ (recognition goodness score; list position; number of recognizer list, . . . );

. . .

$P_n$ (recognition goodness score; list position; number of recognizer list, . . . ).

If during operation procedure a condition occurs for which no conditional probability is known by looking up a table of conditional probabilities, the respective conditional probability may be calculated from neighboring conditions, for example by Bayesian probability or by interpolation.

Instead of defining the conditions in terms of a candidate alone, the whole tables may each represent a condition with respect to a candidate. With this other candidates in the table are considered as well. If, for example, a candidate appears in all lists in second position, the conditional probability that this is the correct candidate depends on the candidates of the positions, especially the first position. If the first positions all show the same candidate, the conditional probability of the second-position candidate is much lower than all first-position candidates are different candidates.

The above conditioned probability formulation for each of the respective candidates (1 through n) can additionally be weighted by the candidate's a priori probability of occurrence. Hence not only is reflected a candidate's speech recognition reliability using the confidence values directly, the conditional probability and/or other inferred quality of recognition measurements but also the probability of correctness is weighted by the likelihood of such an entry having been uttered in the course of the process being addressed via speech recognition. So the likelihood of a large sorting destination, as a large city or country, is higher than of a small sorting destination. Such likelihood parameter with respect to countries, states, cities, or the like, is stored in a table of a database.

The candidate 52 with the highest conditional probability is taken as the most likely candidate 52. Alternatively the top candidates 34 with respect to conditional probability that exceed a given threshold, e.g. 92%, are taken. The final selection is then made by performing a Hidden Markov Recognizer (HMR) correlation between the speech wave-form of the subject utterance and the respective candidate(s). To be selected as the final recognition identification, a given candidate must exceed a pre-specified HMR threshold and have received the highest HMR score.

So the resulting conditional probability statements $P_1$ ( . . . ), through $P_n$ ( . . . ) are assessed against a pre-determined threshold that may have been empirically determined. An advantageous threshold is in the region between 80% and 98%, especially between 85% and 95%, more specifically between 90% and 93%. A single candidate 52 that exceeds the threshold is selected as correct and is used to direct the related item during sortation. If no candidate exceeds the threshold it is continued with the operator repeating the utterance in the way described below.

If more than one candidate exceed the threshold the delta in conditional probability between those candidates that have exceeded the threshold can be examined. If done so and the delta is equal to or greater than a base value derived from empirical prior assessment, the candidate with the higher value is accepted. If the delta is not sufficient or none exceed the threshold several options may be taken.

These optional procedures may either be applied independently or, should a given procedure not yield a single candidate sufficient for sorting, may be applied sequentially. E.g. first have the operator re-voice the utterance, then, if the procedure associated with the second re-voicing does not yield a result, a Hidden Markov Process might be applied, and finally, if still no result is available operator feedback could be utilized.

a) The operator is prompted to repeat (re-voice) the utterance. Note: the prompt for operator re-voicing can be requested multiple times by the system as empirically determined to be of efficacy. Upon each re-voicing the same conditioned probabilistic assessment will be performed using a precompiled database of the appropriately conditioned probabilities.

Upon repetition the utterance is again processed by the multiple voice recognition systems in the way described above. If the criteria for logical inter-recognizer candidate inference described above yield a single candidate this candidate is applied for sorting. If, however, the re-voicing yields no or not a single result, the above conditioned probability calculation is repeated. The repetition may be done in two different ways. First, the calculation is done as described above with the aid of condition as represented in the table derived from the preliminary results of the voice recognition systems. If the newly calculated conditional probability is below the threshold or the above-described delta is not sufficient, the second way may be followed. However, the second way may be taken right away as alternative to the first way.

In the second way the conditional probability is calculated with a table or condition derived from the preliminary results from the first and the following voicings—which could be more than one if the re-voicing is repeated again. The table then contains Nn groups preliminary results, where N is the total number of voicings, and n the number of voice recognition systems, each group containing the number of preliminary results as outputted by the respective voice recognition system. The conditional probability $P_1$ ( . . . ) of a candidate with number 1 reflects additionally the same conditioned factor after the second voicing as follows:

$P_1$ ($CV_{V1}$; list position $_{V1}$; number of recognizer list $_{V1}$, . . . ; $CV_{V2}$; list position $_{V2}$; number of recognizer list $_{V2}$ . . . ), where CV is the confidence value and V1 and V2 represent the factors observed during the first and second voicing respectively. The resulting $P_i$ ( . . . ) for all candidates are assessed against a threshold to determine if the second voicing has allowed a high enough reliability to achieve sorting. The factors used to condition such multi-voicing $P_i$ ( . . . ) can also be inter-voicing related factors. The analogy is direct for more than one re-voicing.

b) The multiple candidates that exceed the threshold are assessed via a pattern match procedure, as a Hidden Markov Process (HMP) or other goodness of match algorithms, against their utterance. This is to determine, if in the absence of contending alternatives that are filtered via the $P_i$ ( . . . )-step or $P_1$ ($CV_{\nu 1}$; list position $_{\nu 1}$; number of recognizer list $_{\nu 1}$, . . . ; $CV_{\nu 2}$; list position $_{\nu 2}$; number of recognizer list $_{\nu 2}$ . . . )-step a sufficiently high match can be achieved to allow one of the candidates that exceeded the threshold(s) to be selected by HMP etc. with sufficiently high reliability to enable sorting. This step can be performed at any stage when multiple $P_i$ ( . . . ) occur.

c) When there is no clear first choice the best choice or choices may be taken and an audio or display feedback may be used for operator confirmation before sorting. In most instances, the confirmation step entails either using synthetic speech to pronounce the top but still ambiguous candidate(s) into the operator's earphones—for the operator to then state: <yes> or <no>. The displaying to operator can also be performed via a display screen mounted convenient to the induction area or even body mounted display such as like wrist or back of hand mounted.

Due to filtering to threshold reliable acceptance via the use of multiple-speech recognizers and the potential to re-voice, only a relatively small corpus of results require audio or display operator feedback. Additionally, the utilization of additional speech recognizers or their tuning, or operator training can be used further to reduce the number of occurrences of operator re-voicing or feedback and correspondingly increase throughput.

The potential to re-voice or getting operator feedback on unclear candidates keeps the error rate down but at the cost of throughput. Hence, assuming roughly 95% recognition and acceptance via the parallel speech recognizers—then in 95% of the parcel handlings the operator would just speak and release—can have the same time & motion productivity as Hybrid Voice. In about, 5% there would be a tone followed by audio or display feedback. Hence, assuming an operator arrives at an utterance throughput of about 2,000 per hour—with a 5% audio/display feedback rate—sorting throughput would be around 1,900/hr. Error rate would however be very low and throughput diminution would be strictly a function of the reliability achieve via multi-speech recognizer processing.

Figure 9A:
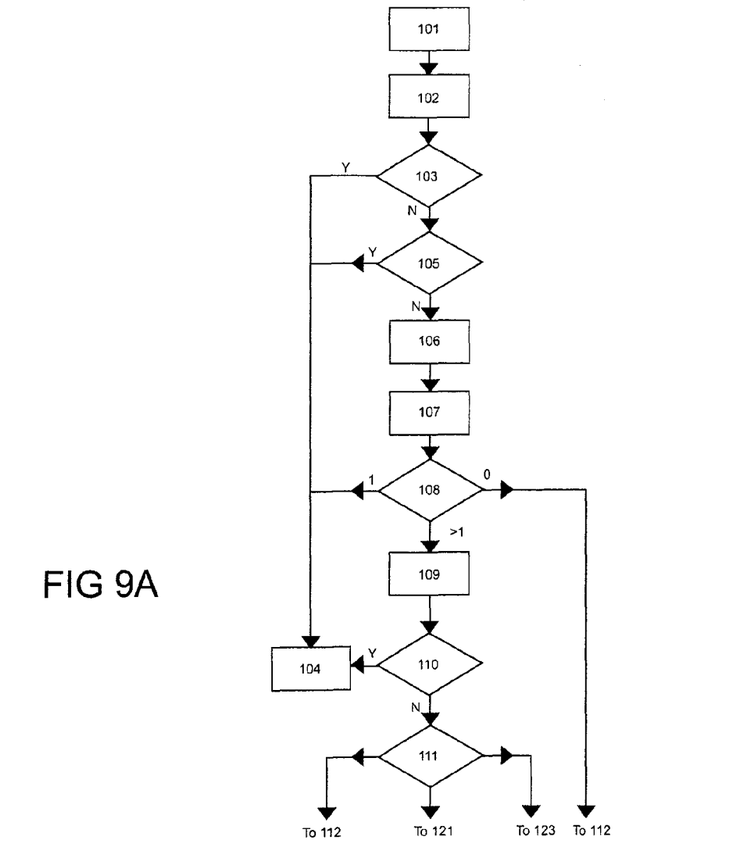
FIG. 9A is a first part of a flow diagram of a method for multi-speech recognizer result arbitration for identifying information placed on or related to a good.
Figure 9B:
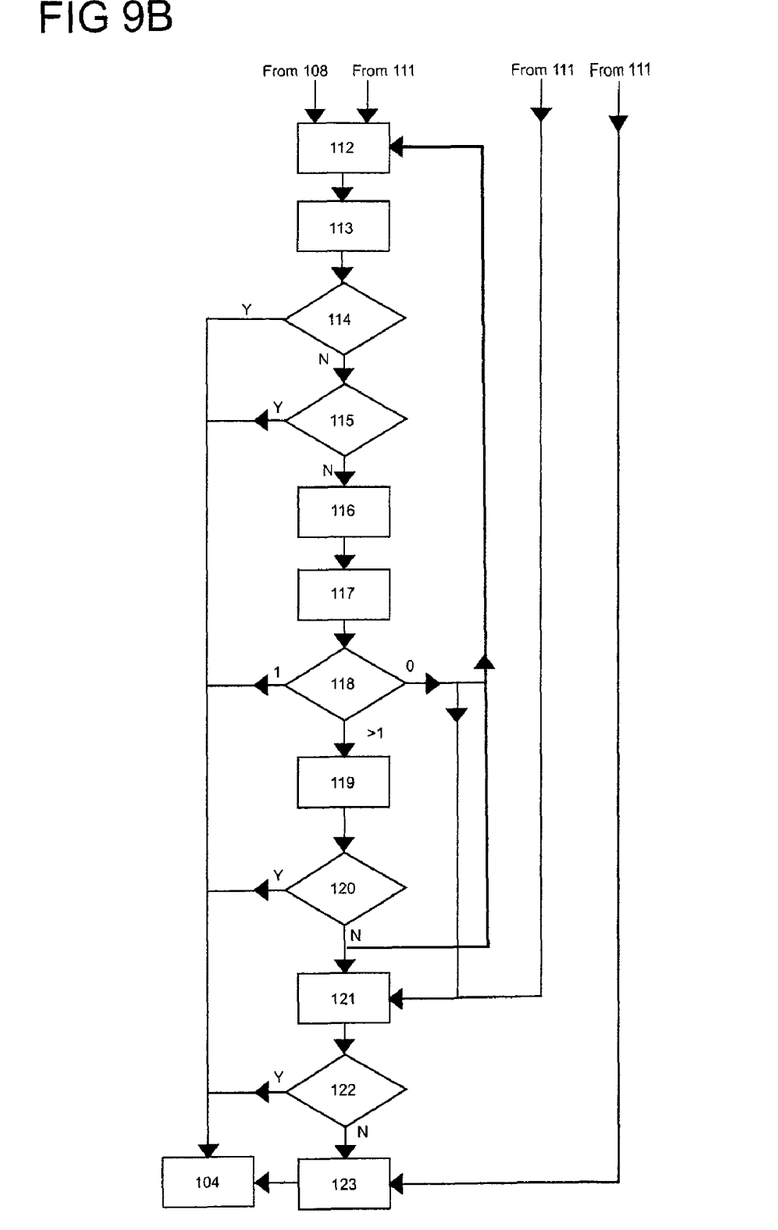
FIG. 9B is a second part of the flow diagram.

FIGS. 9A and 9B show a flow diagram of a method for multi-speech recognizer result arbitration for identifying information placed on or related to an item.

In step 101, an operator reads aloud information associated with an item whose further processing depends on the information. The utterance is captured by a microphone and transmitted to voice recognition.

In step 102, the operator's utterance is processed in parallel by several independent speech recognition systems 20, 22, 24. The task of those systems is to associate the operator's utterance 26 with an element e.g. a word or numeral from a predefined vocabulary database. Each of those systems 20, 22, 24 generates a list 36, 38, 50 of probable alternative results arranged hierarchically with respect to their individual probability.

In step 103, if the first candidate 52 for all lists 36, 38, 50, being the candidate 52 with the highest probability, is identical, meaning all independent recognition systems have decided on the same interpretation of the operator's utterance, the respective candidate is transmitted to the sorting system.

In step 104, the sorting system uses this candidate as a basis for sorting the item the information was associated with.

In step 105, if the first candidate in each list is not identical it is checked whether all candidates in each list are different, except for only one. If it is so, that only one candidate is present in all lists, the candidate is transmitted to the sorting system. However, step 105 is only an option, and may depend on the number of recognizers in the systems, since this condition is less reliably with only two recognizers than with three or more recognizers.

In step 106, if more than one candidate is present in all lists, the system calculates conditioned probabilities for each candidate.

In step 107, the conditioned probabilities for each candidate are assessed against an empirically determined threshold value.

In step 108, it is checked whether the conditioned probabilities exceed the predetermined threshold. If only one candidate exceeds the predetermined threshold, the candidate is transmitted to the sorting system.

In step 109, if more than one candidate's conditioned probability exceeds the threshold, the delta between the candidate with the highest conditioned probability and the conditioned probabilities of the other candidates that exceeded the threshold is determined.

In step 110, the delta is examined. If it exceeds a predetermined threshold the candidate with the highest conditioned probability is transmitted to the sorting system.

In step 111, if the delta does not exceed the threshold, there are several options (112, 121, 123) for further processing. These options might either be applied separately or sequentially in such a way that in case one of the optional procedures does not produce as a result a single candidate another of the optional procedures might be employed. Each option might also be repeated several times instead or before the process is continued using another option or until a single candidate for sorting has been selected. In step 111 the option is chosen.

In step 112, if no candidate from step 108 exceeds conditioned probability threshold the system also continues with step 112 shown in FIG. 9B. In step 112, the operator is prompted to repeat the utterance.

In step 113, again, the utterance is processed in parallel by multiple speech recognizers, each of which produces a list of probable candidates as in step 102.

In step 114, again, if the first and most probable candidate in all lists is identical, this candidate is transmitted to the sorting system (step 104). The sorting system uses this candidate as a basis for sorting the item the information was associated with.

In step 115, again, if the first candidate is not identical for all lists it is checked, whether only one candidate is present in all lists, this candidate is transmitted to the sorting system.

In step 116, in another case, more than one candidate is common to all lists, and the conditioned probabilities are recalculated including now the values for the conditioned probabilities calculated of the first voicing in step 106.

In step 117, the conditioned probabilities for each candidate are assessed against an empirically determined threshold value.

In step 118, if the conditioned probability of only one candidate exceeds this predetermined threshold, the candidate is transmitted to the sorting system. If no conditioned probability of any candidate exceeds this predetermined threshold there are several options: the re-voicing step 112 or step 121.

In step 119, if more than one candidate's conditioned probability exceeds the threshold, the delta between the candidate with the highest conditioned probability and the conditioned probabilities of the other candidates that exceeded the threshold is determined.

In step 120, if the delta exceeds a predetermined threshold the candidate with the highest conditioned probability is transmitted to the sorting system. If the delta does not exceed the threshold, there are several options (steps 112, 121) for further processing. These options might either be applied separately or sequentially such a way that in case one of the optional procedures does not produce as a result a single candidate another of the optional procedures might be employed. Each option might also be repeated several times instead or before the process is continued using another option or until a single candidate for sorting has been selected. One of these options consists in repeating the re-voicing procedure described in step 112. If no candidate from step 116 exceeds conditioned probability threshold used in step 107, 117 the system either repeats the re-voicing procedure described in step 112 or it continues with step 121.

In step 121, the multiple candidates that exceeded the threshold in step 118 are assessed via Hidden Markov Process (HMP) or other goodness of match algorithms against their utterance to determine, if in the absence of contending alternatives a sufficiently high match can be achieved to allow one of the candidates that exceeded the threshold(s) to be selected by HMP etc. with sufficiently high reliability to enable sorting. This step can be performed at any stage when multiple $P_i$ ( . . . ) occur.

In step 122, in case one of the candidates achieves a match it is transmitted to the sorting system.

In step 123, in case no match can be achieved, the best choice or choices may be displayed to the operator either visually or via audio for confirmation. The operator chooses one candidate and the candidate is transmitted to the sorting system.

The invention claimed is:

1. A method for identifying information placed on a good to be processed, and a way of processing depends on the information, which comprises the steps of:
   determining the information by an information determining device;
   converting the information into processed information;
   passing the processed information to an information retrieval system;
   delivering the processed information to a plurality of artificial intelligence packages;
   analyzing the processed information in each of the plurality of artificial intelligence packages and for each of the artificial intelligence packages identifying preliminary results;
   evaluating the preliminary results to identify a most probable result among the preliminary results best matching the information; and
   assigning the most probable result to the good;
   the steps of determining the information by the information determining device, converting the information into the processed information, and passing the processed information to the information retrieval system, further including the steps of:
      reading the information with an identifier and speaking the information as a voice message into the information retrieval system;
      providing the artificial intelligence packages as voice recognition systems; and
   carrying out the evaluation of the preliminary results by means of conditional probabilities of correct recognition, with a determination of the conditional probabilities involving a plurality of identification parameters, and an identification parameter of said plurality being a number of voice recognition systems yielding a same preliminary result in a result list.

2. The method according to claim 1, which further comprises providing a camera as the information determining device, the processed information is an electrical signal and the artificial intelligence packages are optical character recognition systems.

3. The method according to claim 1, wherein the plurality of artificial intelligence packages apply different information recognition strategies.

4. The method according to claim 1, wherein a condition is constituted by preliminary results of all voice recognition systems.

5. The method according to claim 1, wherein an identification parameter is an average distance of a confidence value of a preliminary result of one of the voice recognition systems to a confidence value of a same preliminary result of another one of the voice recognition systems.

6. The method according to claim 1, wherein the conditional probabilities contain a human factor.

7. The method according to claim 1, which further comprises weighting the conditional probabilities with an a-priori probability of a respective preliminary result.

8. The method according to claim 1, wherein the conditional probabilities additionally consider preliminary results obtained by re-voicing.

9. The method according to claim 1, wherein a selection of the most probable result is made by performing a Hidden Markov Recognizer correlation between a speech wave-form of the processed information being a subject utterance and a respective preliminary result.

10. A system for identifying information placed on a good to be processed, and a way of processing depends on the information, the system comprising:
    means for converting the information into a processed information, and passing the processed information to an information retrieval system;
    means for delivering the processed information to a plurality of artificial intelligence packages, said artificial intelligence packages being provided as voice recognition systems;
    means for analyzing the processed information in each of the plurality of artificial intelligence packages and for each of the artificial intelligence packages identifying preliminary results;
    means for evaluating the preliminary results to identify a most probable result among the preliminary results best matching the information; and
    means for assigning the most probable result to the good;
    said means for converting the information into the processed information, and passing the processed information to the information retrieval system including a device for reading the information with an identifier and speaking the information as a voice message into the information retrieval system; and
    said means for evaluating the preliminary results being configured to evaluate the preliminary results using conditional probabilities of correct recognition, with a determination of the conditional probabilities involving a plurality of identification parameters, and an identification parameter of said plurality being a number of voice recognition systems yielding a same preliminary result in a result list.

11. The system according to claim 10, wherein said means for converting is a microphone, the processed information is a voice message and said artificial intelligence packages are voice recognition systems.

* * * * *